United States Patent [19]
Sparber

[11] 3,943,889
[45] Mar. 16, 1976

[54] HEAT DISTRIBUTING TANKS FOR RETARDING SURFACE FREEZING

[76] Inventor: Frederick J. Sparber, R.D. 1, Box 192-A, Belen, N. Mex. 87002

[22] Filed: Mar. 28, 1975

[21] Appl. No.: 562,971

[52] U.S. Cl. ............................................. 119/73
[51] Int. Cl.² ........................................ A01K 7/00
[58] Field of Search ............... 119/73; 165/45, 105

[56] References Cited
UNITED STATES PATENTS

| | | | |
|---|---|---|---|
| 634,579 | 10/1899 | Long et al. | 273/143 A |
| 2,056,515 | 10/1936 | Glaser | 273/143 R |
| 2,394,821 | 2/1946 | Teagarden | 46/192 |
| 2,558,464 | 6/1951 | Schultz | 46/191 |
| 2,660,000 | 11/1953 | Strayer | 46/191 X |
| 2,944,823 | 7/1960 | Gilbert | 273/143 R |
| 3,195,619 | 7/1965 | Tippmann | 165/45 X |
| 3,236,008 | 2/1966 | Ryan | 46/191 |
| 3,463,487 | 8/1969 | Tepper | 273/143 R X |
| 3,618,569 | 11/1971 | Baer | 119/73 |
| 3,745,977 | 7/1973 | Martin | 119/73 |

*Primary Examiner*—Hugh R. Chamblee
*Attorney, Agent, or Firm*—Richard A. Bachand

[57] ABSTRACT

Apparatus for preventing or retarding the freezing of water on a surface of a body of water, such as in a stock tank, includes a tank containing a quantity of volatile fluid, which functions as a heat pipe to distribute heat from a lower portion in the body of water to the surface to prevent ice on the surface from forming thereabout. The tank is ballasted to float just at the surface of the water, and additionally is anchored to control the positional location of the tank in the body of water. In one embodiment, a heat containing collar is employed surrounding the top portion of the tank, and within which the tank is free to move to contain the distributed heat. In another embodiment, the entire surface of the water in a stock tank is covered with an insulation layer having holes of spaced relationship to receive a plurality of heat pipe tanks.

In another embodiment of the invention, a heat pipe tank is connected to a control mechanism of a fill valve in a stock tank to control the water level during freezing temperature conditions.

17 Claims, 6 Drawing Figures

//  3,943,889

HEAT DISTRIBUTING TANKS FOR RETARDING SURFACE FREEZING

BACKGROUND OF THE INVENTION

1. Field of the Invention

This invention relates to apparatus for preventing freezing of water to provide access to drinking water for stock and to control the filling of stock tanks, and more particularly to such apparatus utilizing heat pipes having large heat transfer surface areas.

2. Description of the Prior Art

One of the severe problems encountered by cattlemen is providing a source of water to their cattle, especially in the winter months. Commonly, water is provided in stock tanks, which are readily available and widely used. However, in the winter months, ice forms on the surface of the water in the stock tanks, and the cattle often are unable to break through the ice. Thus, the cattlemen must travel, sometimes several times a day in severely cold weather, to the tanks to break through the ice to the unfrozen water. This is a difficult and time consuming job, especially when the watering tanks are at remote locations, and when the ice thickness is of several inches.

In the summer months, although not as great a problem, the sun may heat the water to a temperature which the cattle find too warm, and they refuse to drink the water, which results in weight loss and other problems. Additionally, because of the warm summer sun, algae and other vegetative growths occur in the tank, which require special cleaning and other time consuming procedures.

The annoyance of the wintertime freezing problem has spawned several proposed solutions. For example, Baer in U.S. Pat. No. 3,618,569, proposes a continuous loop completely filled with fluid. Baer recognizes that water changes density at temperatures close to its freezing point. Before the water freezes, it becomes more dense, and sinks to a lower fluid level. As the water lowers in temperature, it becomes less dense, seeking a higher fluid level until it freezes, at which time the ice forms, beginning at the surface of the water. Thus, a temperature gradient exists in water near its freezing point, being increasinly warmer away from the surface. The Baer device is intended to carry the heat from the lower warmer fluid location to the surface, to retard the surface freezing. It is a continuous loop filled with fluid, such as alcohol, which circulates within the loop by convection. The loop, however, is symmetrical and is a balanced gravity system which carries, in practice, very little heat to the surface. It is therefore operable only for very minor freezing conditions.

Heat pipes have been proposed to retard ice formation, in such applications as on paving, or the like, in Tippmann, U.S. Pat. No. 3,195,619. Tippmann employs a number of elongated heat pipes extending into the ground beneath the pavement, and having a portion located within the paving material itself. The heat pipe has a fluid contained partially therewithin, which is evaporated by the warmer earth temperatures beneath the pavement. The vapor, seeking a lower partial vapor pressure within the pipe, rises to the region of the pipe within the pavement, whereupon, it gives up its heat to the pavement and condenses, flowing back downwardly to the lower warmer region of the pipe. The condensing of the fluid presents sufficient heat to keep the ice on the pavement melted, according to Tippmann.

The Tippmann heat pipe suggestion, however, is not practical in stock tank configurations for several reasons. First, the heat pipes disclosed by Tuppmann are of relatively small diameter. Consequently, unless a large number of such pipes were employed, an insufficient amount of heat would be transferred to the water within the tank. Even so, it is questionable whether a sufficient quantity of heat in the vicinity of a small diameter pipe in the ground exists to actually prevent ice formation in relatively extreme or severe temperature environments. Furthermore, even if such heat pipe were to be employed, the size of the opening in the ice would be too small to be useful for the cattle to gain access to the unfrozen water.

Another problem which is encountered during the winter is in the filling of the water tank, or in the maintaining of the fluid level within the tank. Ordinarily, stock tanks have a fill valve centrally located adjacent the bottom of the tank which is controlled by a float which, due to its buoyancy, is at the surface of the water within the tank. As the water level is depleted, the float decreases its distance from the fill valve, turning the valve on to fill the tank until a sufficient quantity of water is injected into the tank to raise the float to turn the valve off. However, during the winter months, the float becomes completely frozen into an ice layer across the top of the tank. Consequently, if the water level decreases to the point where the valve turned on, the valve may continue to run, since the float often becomes frozen in position, resulting in continual overflowing of the stock tank.

BRIEF DESCRIPTION OF THE INVENTION

In light of the above, it is an object of the invention to present a system for preventing the formation of ice within a stock tank.

It is another object of the invention to present an apparatus for preventing stock tank icing which requires no attention.

It is yet another object of the invention to present an apparatus for controlling the water level within a stock tank during winter months when ice exists on the surface of the water.

It is still another object of the invention to present a system for preventing ice formation upon the surface of a stock tank during winter months, and which prevents the formation or growth of algae in the summer months, and which controls the temperature of the water in the stock tank during summer months.

These and other objects, features, and advantages will become apparent to those skilled in the art from the following detailed description when read in conjunction with the appended claims and accompanying drawings.

The invention, in its broad aspect, presents apparatus for preventing ice from forming on a surface of a body of water. The apparatus includes a heat conducting tank to float in the water adjacent its surface. A fluid partially fills the tank. The fluid has a boiling temperature of less than zero degrees centigrade to produce a vapor of the fluid within the tank when the tank is in the water. The vapor carries heat from a warmer lower portion of the tank to a cooler upper portion of the tank, to prevent ice from forming adjacent the upper portion. In another aspect of the invention, a weight is provided, and an interconnecting means such as a chain, interconnects the weight and the tank to maintain the position of the tank, for example, within reach of the stock.

In another aspect of the invention, apparatus for controlling a submerged fill valve having a control handle within a water tank in all weather conditions, including freezing temperatures, is presented. A heat distributing tank of heat conducting material floats in the water tank, extending from the surface of the water to a lower warmer region of the water. A volatile fluid is introduced into the distributing tank, the fluid having a boiling temperature less than zero degrees centigrade to produce a vapor in the distributing tank when the distributing tank is in the water tank. The vapor carries heat from the warmer lower portion of the distributing tank to an upper portion of the distributing tank to prevent ice from forming adjacent the upper portion in freezing temperature conditions. Means are provided interconnecting the control handle of the fill valve and the distributing tank, whereby the upper buoyant force of the distributing tank acts on the control valve to turn off the fill valve when the water tank is full.

BRIEF DESCRIPTION OF THE DRAWING

The invention is illustrated in the accompanying drawing, wherein.

In the various figures of the drawing, like reference numbers are used to denote like parts.

DETAILED DESCRIPTION OF THE PREFERRED EMBODIMENTS

Figure 1:
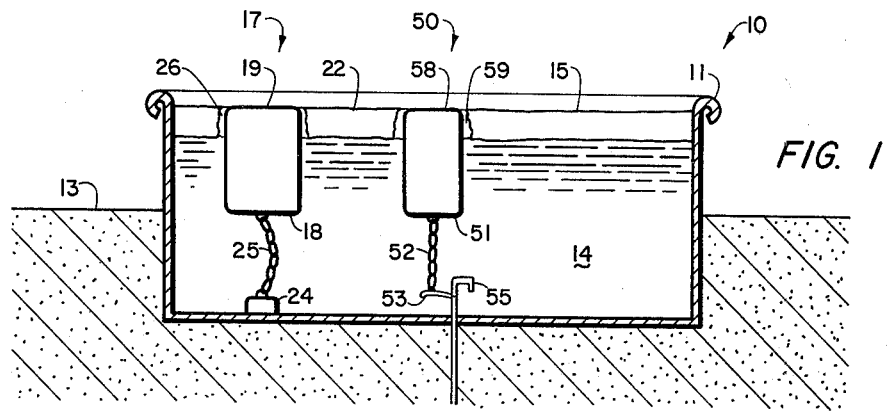
FIG. 1 is a side elevation in cross-section of a stock tank employing an ice preventing heat pipe tank adjacent its side for providing access to the unfrozen water for stock and an ice preventing heat pipe tank for controlling the fill valve, in accordance with the principles of the invention.

As shown in FIG. 1, a stock tank system 10 includes a common stock tank 11 emplaced on the ground 13, or, partially buried, as shown. (Typically, stock tanks are about two feet deep, but can be partially buried, if desired, as shown, to prevent heat loss from the bottom walls of the tank.) The tank 11 is filled with water 14, and has a thin layer of ice 15 on the top thereof.

In accordance with the invention, a tank 18, constructed as below described, is placed into the tank 11 adjacent its edge to provide access to the unfrozen water 14. The tank 18 is ballasted, as below described, to float with its top 19 at, or just above, the surface 22 of the water level within the tank 11. The position of the tank 18, that is, its proximity to the edge of the tank 11, is maintained by a weight 24 which is connected to the tank 18 by interconnecting means, such as a chain 25.

The tank 18 can be any desired size or shape. Ideally, it should be of sufficient height to extend well into the water 14 within the tank 11, but not so long as to contact the bottom of the tank when it is pushed downward by, for example, a cow seeking access to the unfrozen water. It has been found that ordinary butane tanks are particularly well suited for use in this application. Such butane tanks ordinarily are cylindrical shape of dimensions approximately one foot in length and one foot in diameter.

Figures 2, 3:
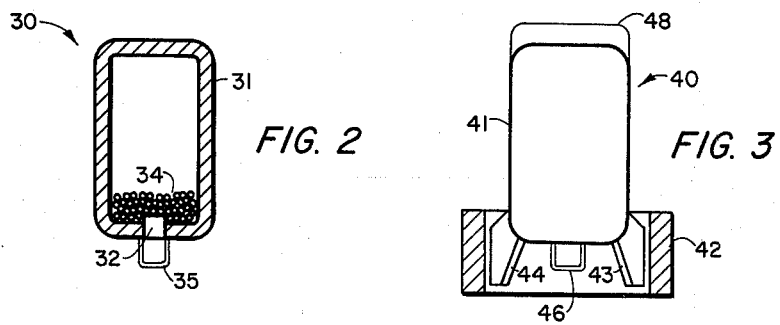
FIG. 2 is a side elevation of a heat pipe tank, showing one embodiment of ballasting the heat pipe tanks of FIG. 1 by using shot within the tank.
FIG. 3 is a side elevation of another embodiment for ballasting a heat pipe tank using a weight ring external to the tank.

With respect to the tank itself, one embodiment thereof is shown in cross-section in FIG. 2, and denoted generally by the reference numeral 30. As shown, the tank 31 has a valve at the bottom thereof to enable a quantity of a volatile fluid to be injected into it. (The tank 31, if it is of the commonly employed butane tank type, is merely inverted from the ordinary butane tank configuration.)

The tank 31 has means for ballasting it in the form of shot 34, as above indicated. A sufficient amount of the shot is placed within the tank 31 to weight it so that its top 19 is adjacent the surface, or just protruding above the surface 22 of the water 14 or ice 15 which may have formed thereupon.

A ring 35 is attached to the bottom of the tank 31 to which the position maintaining chain 25 can be attached. At this juncture it should be noted that the chain 25 together with the weight 24 are not intended to function to maintain the height of the tank 19 within the water 14. The height is maintained entirely by the ballast or shot 34. Rather, the chain and weight are intended to maintain the relative location of the tank 19 adjacent the edge of the stock tank 11 within reach of the cattle.

Another configuration for the tank, in accordance with the principles of the invention, is shown in FIG. 3, and is denoted by the reference numeral 40. The tank assembly 40 includes a tank 41, of similar construction to that described above with reference to the tank 31 in FIG. 2, except that the means for ballasting is in the form of a collar or ring 42, shown partially cut away, attached by wings or fins 43 and 44 to the walls of the tank 41. A ring or loop 46 is attached to the bottom of the tank for attachment to the position maintaining chain 25 and weight 24, in a manner similar to that described with reference to FIGS. 1 and 2.

To counteract the heat losses from the top of the tank 41, a layer of thermal insulation material, such as styrofoam or the like, 48, may be glued or affixed upon the top surface of the tank 41.

With reference again to FIG. 1, in addition to the use of such tank 18 adjacent the side to provide access for the cattle to the water 14, a similar tank can be employed in connection with the fill valve 55, as shown by the tank assembly 50. The tank assembly 50 includes a tank 51 of similar configuration to that of the tank 18 above described, with the exception that it is unballasted, and allowed to float freely within the water 14. The tank 51 is attached by a chain 52 to the fill valve control, such as the valve handle 53 illustrated. The length of the chain 52 is chosen such that the tank 51 will be positioned when the water level is properly filled within the tank so that the top 58 is just above the surface of the water in the tank. Thus, in operation, the tank 58 will serve to keep the valve control lever 53 of the valve 55 urged upwardly to prevent the tank from being filled when the water in the tank is at the proper level. However, when the water level drops, the tank 58 also will drop, opening the valve 55 to fill the tank until the tank 58 rises to a sufficient level to close the valve 55 by its upward buoyant force.

An amount of volatile fluid (not shown) is injected into each of the tanks 18 and 51. The tanks 18 and 51 therefore function essentially as heat pipes having very large heat transfer capabilities. The fluid introduced into the tanks should be of the type which vaporizes or boils at a temperature well below the freezing temperature of water. Therefore, with the fluid in the tank, as described, the heat of the denser warmer water near the middle and bottom portions of the tank 11 will be absorbed by the fluid to vaporize it. The vapor will tend to travel to a point within the tanks 18 and 51 at a lower vapor pressure, adjacent their cooler tops 19 and 58. At this point, the heat within the vapor will be given off to the colder regions adjacent the tops 19 and 58, at which the ice in the tank 11 is forming. Upon contacting the cooler wall of the tanks 18 or 51, the vapor is condensed, to drip back down to the warmer regions of the tank to repeat the process. The heat thus given off adjacent the top will cause the ice to melt in an annulus 26 surrounding and adjacent the top of the tank 19, thereby keeping the tank 18 free within the ice layer 15. An animal (not shown) attempting to drink the unfrozen water 14 within the tank 11, consequently, needs only to push downwardly on the top 19 of the tank 18, for instance, with its nose, displacing the tank 18 and enabling it to drink the water. When the animal has finished drinking, the tank 18 will reenter the unfrozen area which it previously occupied, and maintain the unfrozen annulus as described.

Likewise, the tank 51 controlling the fill valve 55 will maintain an annulus 59 surrounding the top 58 of the tank 51. Thus, regardless of the level of the water within the tank 11, the tank 51 will not freeze into the ice, and the fill valve 55 will be effectively controlled to maintain the water level.

Because of the relative size of the tanks 18 and 51, a tremendous quantity of heat from the lower portions of the tank can be redistributed to the ice layer 15 across the top of the tank to the relatively small annuli 26 and 59, respectively. Being essentially heat pipes with extremely large heat transfer surface areas available, theoretically, quantities of power in the megawatt range can be extracted from the warmer water 14 near the bottom of the stock tank 11.

It would be pointed out that the exact dimensions of the heat pipe tanks employed are not critical. The primary consideration in the choice of the tank dimensions is simply to provide a sufficient surface area to enable a large enough quantity of heat to be transferred from the warmer, deeper regions of the water to the cooler surface regions to prevent ice formation at the surface. This, in part, is dependent on the temperature ranges encountered. To illustrate this variability, for example, the fill valve control tank 51 is shown of smaller size than the drinking water providing tank 18.

In the actual fabrication of the heat pipe tanks described, as mentioned, readily available butane tanks can be handily employed. If, for example, a typical butane tank having a volume of approximately 0.7333 cubic feet is used, a vacuum is pulled within the tank to rid it of undesirable condensable gasses. The tank is then backfilled with a volatile fluid. Typically, a freon 11 can be backfilled in the tank, having a boiling temperature well below the freezing temperature of water. The tank itself should be metallic or of heat conducting material, and, should be nontoxic to cattle. Additionally, the particular gas or liquid or fluid used in the tank should be nontoxic to prevent injury to the animals in the case of leakage from the tank. The quantity of the fluid in the tank may vary, but it has been found that a typical 12-inch diameter butane tank functions suitably when filled with 1 to 2 pounds of freon 11. Other types of volatile fluids such as other types of freon, such as freon 22, freon 12, freon 11, or propane, ammonia, or other such fluid, or, in general, any fluorocarbon refrigerant, can be equally advantageously employed to serve as the volatile fluid. The main requirement of the volatile fluid employed, as above described, is that it be capable of transferring heat in the range of the freezing temperature of water. Thus, any fluid having a boiling temperature below zero degrees centigrade and having a critical temperature well below zero degrees centigrade can be used.

Figure 4:
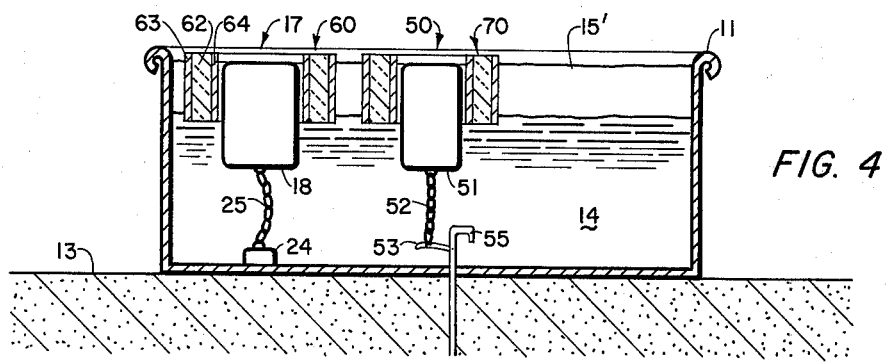
FIG. 4 is a side elevation in cross-section of another embodiment of the ice preventing heat pipe tanks in accordance with the invention using heat containing insulating collars.

In applications in which more extreme temperatures are encountered, and in which thicker ice levels are likely to form upon the water surface, such as shown by the thicker ice layer 15' in FIG. 4, a collar of thermal insulation can be employed. Thus, with reference to the tank 17, a collar 60 is used. The collar 60, shown partially cut away, is of doughnut shaped cross-section, of insulating material 62, and is sandwiched between metal retaining sheets 63 and 64. The insulating collar 60 serves to reduce the heat losses from the heat pipe tank 18 to the adjacent ice 15'. Thus, the heat given off from the top of the tank 18 is injected directly into the annulus between the tank 18 and the inner sheet 64 of the insulating sandwich 60. Similarly, an insulating sandwich 70 surrounds the heat pipe tank 50 which controls the fill valve 55 therebeneath. Thus, in more extreme environments, using the insulating sandwich cylinder around the heat pipe tanks enables the tanks to prevent icing over larger temperature ranges. It can be seen that the heat pipe tank assembly 17 effectively provides a fountain at which unfrozen water is made available, practically without regard to the freezing temperatures.

Desirably, the collar 60 is of length less than the length of the tank 18 it surrounds. This allows a greater source of heat to the bottom portion of the tank 18 to be transported to the surface by the contained volatile fluid and vapor.

The sandwiches of insulating material 60 can, of course, be formed in other ways, which will be obvious to those skilled in the art, for example, by replacing the inner and outer sheets 63 and 64 with retaining rings, or other such configuration of parts.

Figure 5:
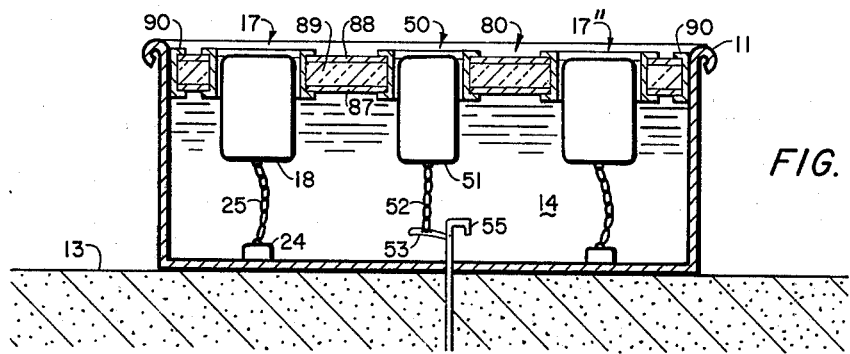
FIG. 5 is a side elevation in cross-section of another embodiment of the ice preventing heat pipe tanks in accordance with the invention using an insulating sandwich floated upon the water surface in a stock tank.
Figure 6:
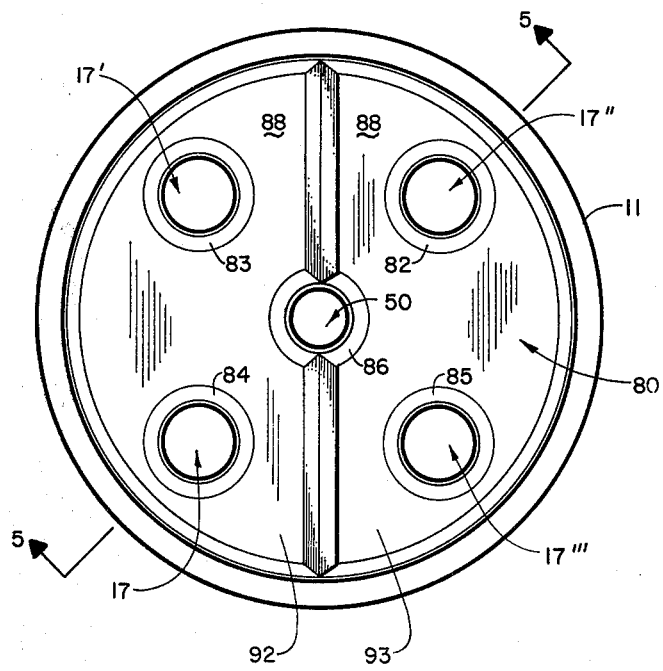
FIG. 6 is a plan view of the ice preventing heat pipe tanks of FIG. 5.

Heat losses adjacent the heat pipe tanks can be provided in still other ways. For example, as shown in FIGS. 5 and 6, planar insulating sandwiches 80 can be floated on the surface of the water 14. Holes 82–86 are provided at spaced intervals each to receive a respective heat pipe tank 17—17'''. As shown more particularly in FIG. 5, the sandwich 80 includes a planar layer 89 of thermal insulation such as styrofoam or the like, emplaced between two metal plates 87 and 88. The edges of the sandwich at which the insulation 89 is exposed, such as around the circumference of the sandwich, along the dividing line separating the halves of the sandwich, and around the various holes 82–86 are enclosed with a U-shaped channel 90, appropriately formed to conform with the contours of the sandwich along the respective edges. The purpose of the U-shaped channels 90 is to prevent the water 14 from entering the sandwich between the metal layers 87 and 88, and to prevent the insulation material from being accessible to the stock.

The sandwich 80 can be made, as shown in FIG. 6, to be conveniently emplaceable on the water surface in a circular shaped tank 11 by forming it of two semi-circular halves 92 and 93. Other convenient shapes can easily be devised to ease the handling and transportation problems as may be encountered in providing such insulating sandwich cover for individual stock tanks.

With the insulation sandwich 80 thus emplaced, the water in the tank 11 will not freeze over the surface portions thereof covered by the insulation sandwich. The respective heat pipe tanks 17–17''' and 50 will prevent the water from freezing within the respective holes 84–86 formed through the insulation. Thus, in the wintertime, a stock tank employing the plurality of heat pipe tanks and the insulation layer will always have accessible unfrozen water available to the cattle, and the water will be maintained at the proper fill level.

The use of the insulation layer 80 has an additional advantage during the summertime months in that its use (without the respective heat pipe tanks) will restrict the sunlight to the interior of the tank 11. Thus, the growth of algae which is ordinarily encountered is retarded. Furthermore, because of the insulation layer 80, the temperature of the water 14 within the tank 11 will be maintained at an acceptable level.

Although the invention has been described and illustrated with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim:

1. Apparatus for preventing ice from forming on a surface of a body of water, comprising:
   a heat conducting tank to float in said water with a top portion adjacent said surface, and
   a fluid only partially filling said tank,
   said fluid having a boiling temperature less than zero degrees centigrade to produce a vapor of said fluid within said tank when said tank is in said water to carry heat from a warmer lower portion of said tank to a cooler upper portion of said tank, to prevent ice from forming adjacent said upper portion,
   said tank having sides extending smoothly and continuously essentially vertically downward to the warmer lower portion of said water, whereby said tank remains movable if ice forms in said water.

2. The apparatus from claim 1 wherein said fluid is a fluorocarbon refrigerant.

3. The apparatus of claim 1 wherein said fluid is selected from the group consisting of freon 22, freon 12 and freon 11.

4. The apparatus of claim 1 wherein said tank is of dimensions approximately 1 foot in length and 1 foot in diameter.

5. The apparatus of claim 1 further comprising means carried by said tank for ballasting said tank to maintain its position adjacent said surface.

6. The apparatus of claim 1 further comprising a weight to rest on a bottom surface of said body of water and means for interconnecting said weight and said tank to maintain its location in said body of water.

7. A fountain for providing stock access to water under water freezing conditions, comprising:
   a tank having dimensions of approximately one foot in diameter and one foot in length, and of heat conducting material for placement in the water,
   means carried by said tank for ballasting said tank with an end of said tank adjacent the surface of the water,
   a volatile fluid within said tank in a quantity of about one tenth of the volume of said tank,
   said volatile fluid having boiling and critical temperatures below the freezing temperature of the water,
   whereby said volatile fluid is vaporized by the heat of the warmer water adjacent the tank away from the surface and is condensed by giving up its heat to the cooler water adjacent the tank adjacent the surface to retard its freezing,
   thermal insulating collar means surrounding said tank, said collar means being of length less than the length of said tank, and of diameter larger than said tank to enable said tank to freely float therewithin, to contain the heat given up by the condensing volatile fluid to within said collar, and,
   means for ballasting said collar means to float with a portion thereof above the surface of the water, whereby the tank can be displaced by the stock for access to the water within said collar.

8. The fountain of claim 7 further comprising a weight and means interconnecting said weight and said tank to maintain the position of said tank.

9. The fountain of claim 7 wherein said collar comprises a cylinder of insulation material.

10. The fountain of claim 7 wherein said ballast means for said collar comprises a layer of metal material encasing said insulation material on at least two sides thereof.

11. The fountain of claim 7 wherein said volatile fluid is selected from the group consisting of freon 22, freon 11, and freon 12.

12. The fountain of claim 7 wherein said collar comprises a planar sheet of insulation floated on the surface of said water having a hole therethrough within which said tank is located.

13. Apparatus for controlling a submerged fill valve having a control handle, within a water tank, in all weather conditions, including freezing temperatures, comprising:
   a heat distributing tank of heat conducting material to float in said water tank, said tank having smooth and continuous essentially vertical sides extending from a top water surface to a warmer lower region of the water,
   a volatile fluid in said distributing tank having a boiling temperature less than zero degrees centigrade to produce a vapor in said distributing tank when said distributing tank is in said water tank, to carry heat from the warmer lower portion of said distributing tank to an upper portion of said distributing tank, to prevent ice from forming adjacent said upper portion in freezing temperature conditions, whereby said tank is movable and buoyant in said water in all weather conditions, and
   means interconnecting the control handle of said fill valve and said distributing tank, whereby the upward buoyant force of said distributing tank acts on said control handle to turn off said fill valve when said water tank is full.

14. The apparatus of claim 13 further comprising an insulating collar surrounding said distributing tank within which said distributing tank is free to move for reducing heat losses adjacent said distributing tank.

15. The apparatus of claim 14 wherein said insulating collar is of cylindrical shape coaxially surrounding at least the upper portion of said distributing tank.

16. The apparatus of claim 14 wherein said collar is a planar sheet of insulation material floated on the surface of the water in said water tank and having a hole therethrough within which said distributing tank floats.

17. The apparatus of claim 13 wherein said volatile fluid is selected from the group consisting of freon 22, freon 12, and freon 11.

* * * * *